United States Patent [19]
Bradley

[11] 4,020,634
[45] May 3, 1977

[54] VISCOUS BLOWER DRIVE
[75] Inventor: John E. Bradley, Inkster, Mich.
[73] Assignee: Ford Motor Company, Dearborn, Mich.
[22] Filed: May 5, 1976
[21] Appl. No.: 683,369
[52] U.S. Cl. .................................. 60/517; 60/524; 417/15; 417/212
[51] Int. Cl.[2] ......................................... F02G 1/04
[58] Field of Search ............... 417/15, 212; 60/517, 60/524, 650, 682, 525

[56] References Cited
UNITED STATES PATENTS

| | | | |
|---|---|---|---|
| 3,782,120 | 1/1974 | Brandenburg | 60/524 |
| 3,859,794 | 1/1975 | Hakansson | 60/524 |
| 3,935,705 | 2/1976 | Harrewijne | 60/517 |
| 3,956,892 | 5/1976 | Nystrom | 60/517 X |

Primary Examiner—Allen M. Ostrager
Attorney, Agent, or Firm—Joseph W. Malleck; Keith L. Zerschling

[57] ABSTRACT

A drive system for a blower, forming part of an external heating circuit of a Stirling engine, is disclosed. A viscous-shear coupling is arranged with the input member thereof concentrically surrounding a one-way clutch which in turn is mounted on an accessory shaft extending through the assembly. The drive system is effective to operate only after the engine has reached predetermined thermal operating conditions; a power transfer is made from an auxiliary blow motor drive to said system upon reaching said conditions.

6 Claims, 2 Drawing Figures

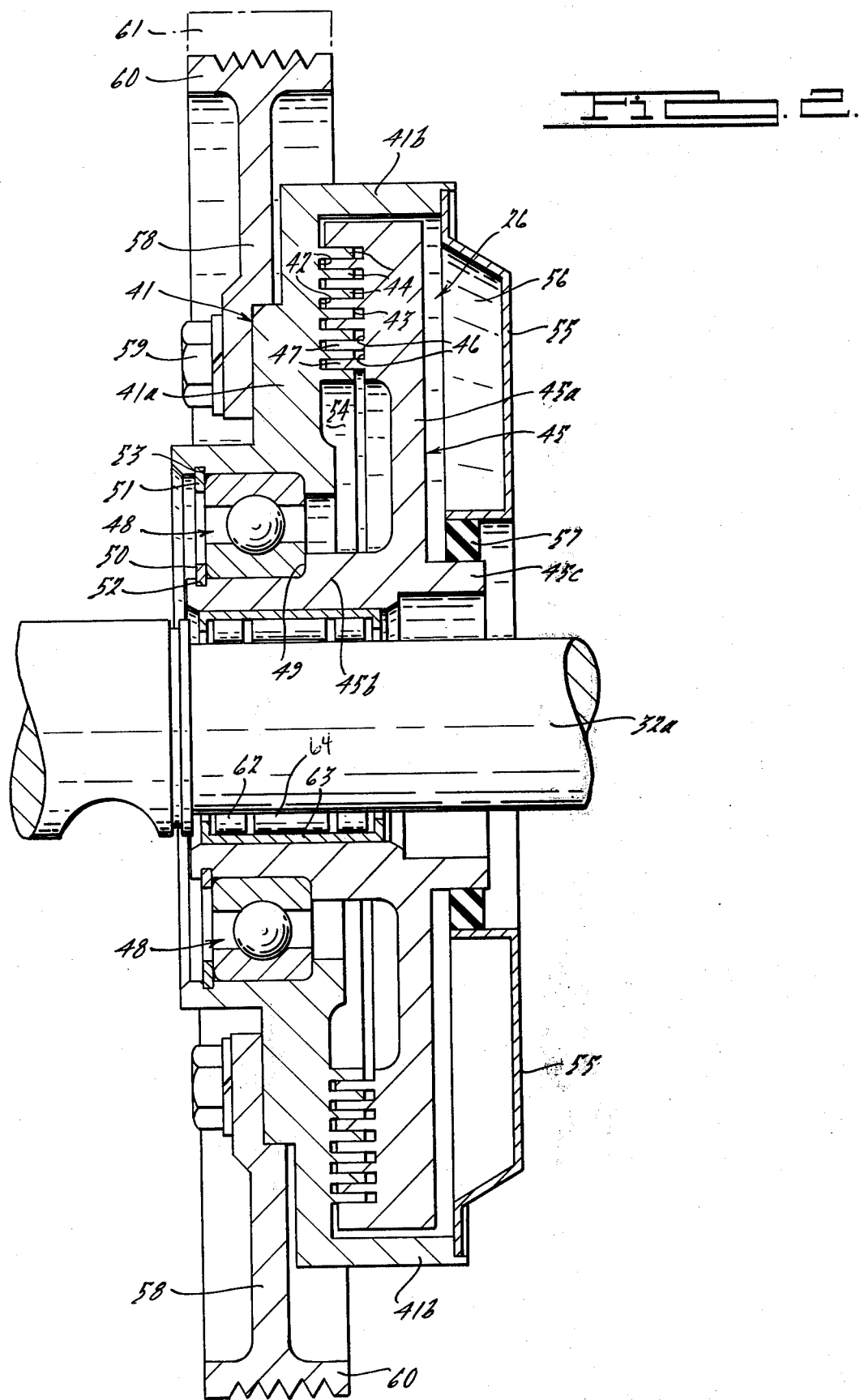

VISCOUS BLOWER DRIVE

BACKGROUND OF THE INVENTION

The Stirling engine, which is under development work for automotive applications, employs an external heating circuit which demands a high air flow mass therethrough for promoting proper thermal conditions to operate the engine efficiently. To obtain such air flow mass, a blower or compressor is required to force the air through a preheater matrix and into the combustion chamber and back again through the preheater matrix. In most state of the art automotive applications of the Stirling engine, the blower is connected directly to the output shaft or accessory shaft of the engine by way of a belt drive. This direct belt is typically designed with a blower to engine speed ratio which will give the required air delivery at idle engine speed. However, this usually results in a ratio (about 5.0:1.0) at idle; this ratio becomes excessive and more than what is required at higher engine speeds. At 600 r.p.m. engine speed, a 5.0:1 ratio is desirable; at 4000 r.p.m. speed the desired ratio typically becomes 3.5:1. The ratio must vary with engine speed. The large single ratio drive system results in excessive speed, noise and parasitic power consumption due to the driving of the blower at undesirable speeds and/or torques.

What is needed is a power transmitting system that can be interposed between the blower and the engine which will allow a change of speed ratio between the engine and blower that is generally inversely proportional to the output speed of the engine; the blower operation should be isolated from speed changes of the engine. This will require a power transmitting mechanism which (a) affords a wide variation in speed ratios, (b) is light weight and (c) is compact to suit the needs of automotive limitations and low cost.

SUMMARY OF THE INVENTION

The primary object of this invention is to provide a power transmitting system for a blower of a Stirling engine which assures that the blower is not responsive to speed changes of the engine and that the speed ratio permitted between the engine and blower is approximately inversely proportional to output speed of the engine.

Another object of this invention is to provide an improved power transmitting system between a blower and Stirling engine, the system being characterized by low cost, low weight and compact size to facilitate installation within very strict limitations of automotive applications.

Still another object of this invention is to provide a power transmitting system for use between a blower and a Stirling engine, the system permitting power take-off from the accessory shaft, driving said blower at points beyond the blower drive system; the system also provides for disengagement of the accessory drive shaft, performing as the input to such system during engine start-up.

Yet still another object of this invention is to provide a power transmitting system for use between a blower and a Stirling engine, which system is effective to operate only after the engine has reached predetermined thermal operating conditions so that proper power is being transmitted through the engine to its output shaft; the power transfer is made from an auxiliary blower motor to such output shaft without affecting engine efficiency.

Specific features pursuant to the above objects comprise the use of (a) a viscous shear coupling having an annular configuration mounted about an overrunning one-way clutch, said combination being mounted upon an accessory shaft extending centrally therethrough, (b) the engine system is arranged so that the alternative motor drive for said blower is cut out at a second level of predetermined thermal operating conditions of the engine after another motor is energized above a first level of thermal operating conditions and has cranked the engine to a specific r.p.m.

SUMMARY OF THE DRAWINGS

FIG. 2 is an enlarged central sectional view of the viscous drive and overrunning clutch forming the principal elements of the power transmitting system for said blower.

DETAILED DESCRIPTION

Figure 1:
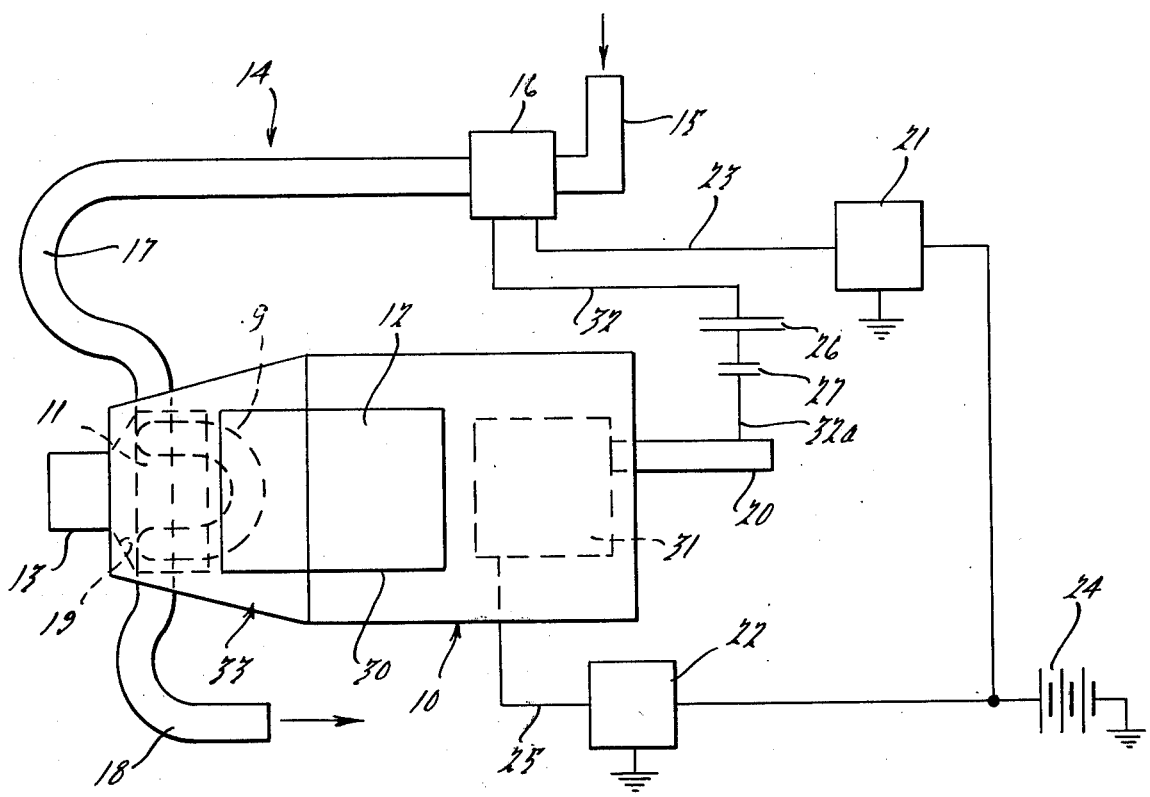
FIG. 1 is a schematic illustration of a Stirling engine and its accompanying external heating circuit as well as a power transmitting system for driving the blower of said heating circuit.

Turning to FIG. 1, there is shown a Stirling engine 10 which has an external heating circuit 14. The external heating circuit is adapted to supply heat to an internal closed working fluid circuit or means 30. The internal circuit is typically comprised of a plurality of heater tubes forming an array which communicate a hot section of the internal circuit with a cooling section by way of a regenerator, all of which are not shown. Suitable driven means 31 acts in response to thermal cycling of the internal circuit 30 to produce driven power in output member 20. The external circuit draws air from ambient conditions through an inlet tube 15; such air is pressurized by a blower 16 and delivered by way of passage 17 through a preheater 11 to a combustion chamber 19 interrupting the circuit 14 and which chamber is supplied with fuel and spark from means 13. The combusted gases follow a generalized path 9 and are then exhausted through a passage 18 after having passed through the preheater device 11.

Two electric motors are employed for providing auxiliary power during the starting sequence of the engine. Electric motor 22 is selectively powered by a stored electrical source 24 and is adapted to crank the mechanical driven means 31 (which normally is driven in response to thermal cycling of the engine) through linkage 25. Electric motor 21, also powered by the stored electrical source 24, is adapted to drive the motor blower during periods when the driven member 20 is unable to provide proper power. When both the electrical motors are cut out, due to the engine having reached predetermined operating temperature and speed, the driven member 20 (which includes directly coupled accessory shafts) is then suitably connected to drive the blower 16 by way of linkage (or connection) 32 having interposed therein a variable speed viscous shear coupling 26 and a one-way overrunning clutch 27. The linkage has an accessory shaft 32a extending centrally through the coupling and clutch.

A typical starting and running sequence for the Stirling engine of FIG. 1, is as follows:

a. An ignition switch (not shown) is closed, energizing the blower motor 21 causing the blower 16 to start compressing and inducting air. The entire external heating circuit is thus cleared of residual gases by virtue of ambient air being positively driven through the entire system for approximately a 4 second period.

b. After the 4 second period, a delay element (not shown), having prevented introduction of fuel and spark, now permits fuel and spark into the combustion chamber 19 increasing the temperature in the heater head 33. During this period, the driven means 31 of the engine is inoperative due to insufficient temperature in the heater head and closed working fluid system.

c. When the temperature in the heater head assembly reaches 600°–625° C, the starter motor 22 is energized automatically (by control means not shown) causing the mechanical transmission means 31 to be cranked and thereby drive the output member 20.

d. When the output member 20 reaches 400 r.p.m., the starter motor 22 is de-energized and is detached from the engine operating system.

e. When the temperature in the heater head assembly reaches 675° C, blower motor 21 is de-energized and is eliminated from the engine operating system.

In this last stage (e), the output member 20 is being driven by the thermal cycling of the engine. In stage (d), power to the blower can come through alternative paths; depending on the speed of the blower, the output shaft may be unable to transmit power through linkage 32 to the blower by virtue of the overrunning clutch 27. The speed of the impeller element, driven by the blower motor, will usually be in excess of the driven shaft 20 thus causing clutch 27 to overrun the accessory shaft 32*a* and thereby allow the electric motor 21 to dominate the driving of the blower. When the blower motor 21 is cut out during step (e) the speed of the driven shaft 20 will, in most cases, tend to exceed that of the impeller and thus provide a positive driving connection through linkage 32 to the blower.

The speed ratio of the positive driving connection through means 32 will vary, depending on the relationship between the impeller speed and output speed of the engine. The viscous shear drive unit to facilitate this variable drive ratio, the speed ratio between the engine and blower is inversely proportional to the output speed of the engine. To this end, the viscous shear coupling or drive unit 26, as shown in FIG. 2, comprises an output element 41 having an annular disc 41*a* carrying an outer cylindrical drum of flange 41*b*; a plurality of annular grooves 42 are defined in a portion of the face 43 of the disc 41*a*. The grooves results in the definition of radially spaced ribs 44; the ribs are concentrically arranged one within the other and all extend to one side thereof as shown in FIG. 2. The input element 45 is also comprised of an annular disc 45*a* having a centrally located cylindrical flange 45*b* and a plurality of grooves 46 adapted to mate in meshing relation with the ribs 44 of disc 41*a*. The grooves 46 result in the definition of ribs 47 which extend into the grooves 42 of disc 41*a*. The ribs 47 are accordingly concentrically arranged, one within the other, and extend to the left side as shown in FIG. 2.

The output member 41 is mounted on the central flange 45*b* of the input member by way of a bearing assembly 48 held in place against a shoulder 49 of the flange 45*b* by retainer ring 50 and 51 fitted in grooves 52 and 53. A fluid chamber 54 is defined about the spacing between the input and output members; the chamber is closed by wall 55 extending from flange 41*b* to flange 45*c* of the input member; the wall 55 has a plurality of radiating or cooling fins 56. Wall 55 has a solid connection to the outer flange 41*a* but extends closely adjacent the interior periphery of the inner flange 45*c*; the spacing therebetween being sealed by an element 57.

The driving connection from the output member 41 to the blower impeller is provided by way of a wheel or flange 58 coupled at 59 to the output member; the wheel 58 has an outer cylindrical surface 60 contoured to receive a pulley belt 61 thereon which in turn connects with the impeller.

The input member 45 is rotatably journalled on the oneway clutch 27 which in turn is mounted about the accesory shaft 32*a*. The overrunning clutch 27 may be of a conventional construction utilizing a plurality of sprags 62 and bearings 64 retained within a cage 63 so that relative rotation between the accessory shaft (acting as the inner race) and the coupling input member 45 (acting as the outer race) is permitted in one direction and not the other. The sprags are tiltable for making a positive drive or withdrawing positive drive therebetween. The clutch 27 permits overrunning of the viscous shear coupling with respect to the output shaft 20.

The positioning of the viscous shear coupling unit on the accessory shaft, with the accessory shaft extending therethrough, permits all other power take-off connections to be made downstream of the accessory shaft facilitating a greater compact arrangement of the engine. The overrunning clutch permits the accessory shaft to be disengaged from the blower when the blower is being driven by the electric motor 21 during engine start up. When the engine is running, the accessory shaft turns the input member 45 through the overrunning clutch. The input member turns the output member at approximately a uniform speed regardless of the speed of the input member.

The viscous shear coupling or clutch 26 is capable of providing a wide variance in speed ratios between the accessory shaft and impeller, particularly in the speed ratio range of 3.5–5.0:1. To this end, a silicon oil which is relatively thick and provides a suitable surface tension, is employed as the fluid medium within the clutch 26. As the accessory shaft speeds up, the torque of the input member increases causing a greater slip to take place between the surfaces of the respective intermeshed ribs and grooves. A progressive shearing of the oil thus takes place.

A typical design application to achieve such speed ratio range in a Stirling engine having a 170 H.P. size, would be as follows: the outer diameter of each of the input and output members would be about 5 inches, the total shear surface area would be approximately 30 in.$^2$ and the viscosity of the oil would be arranged at about 2000 C.S. All of these are general parameters known to those skilled in the art to achieve a desired speed ratio variation within the viscous shear clutch.

I claim:

1. In a Stirling engine having an external heating circuit employing a blower and a closed internal fluid system actuated by predetermined thermal operating conditions for driving an output member, which in turn is adapted to drive said blower, a drive system for said blower comprising:

a. first motor means powered by a source of stored electrical energy and selectively driving said output member when both said internal system is above a first level of said predetermined thermal operating conditions, and said output member is below a predetermined r.p.m., b. a second motor means powered by a source of stored electrical energy and selectively driving said blower when said internal system is below a second level of said predetermined thermal operating conditions, said second level being higher than said first level, and c. variable ratio power transmitting means interconnecting said output member and blower providing drive therethrough when said second level of predetermined thermal operating conditions is exceeded.

2. A drive system as in claim 1, in which said power transmitting means comprises a viscous shear coupling and a one-way clutch, said coupling having an input element drivingly connected to said engine output member and having an output element connected to said blower, said one-way clutch being interposed in the connection of one of said elements with said output member.

3. A drive system as in claim 2, in which said power transmitting means comprises a viscous shear coupling which is effective to proportion the rotary speed transmitted in response to the increase of speed of the input element.

4. A blower system for a Stirling engine having an external heating circuit employing forced air driven by a blower, comprising:

a. a rotary blower having an impeller effective to pressurize a supply of ambient air, b. an accessory shaft driven by said engine, and c. means interposed between said accessory shaft impeller providing a variable drive ratio therebetween inversely proportional to the output speed of said engine, said means having an interfitting viscous shear element to provide said variable ratio.

5. A blower system as in claim 4, in which said interfitting viscous shear elements comprise an output element drivingly connected to said impeller and an input element connected to said accessory shaft, said system further comprising a one-way clutch means interposed between said viscous shear input element and said accessory shaft whereby said elements are limited to the transmission of power to said impeller only when said accessory shaft is rotating at an r.p.m. equal to or in excess of the r.p.m. of said impeller.

6. A blower system as in claim 5, in which said accessory shaft extends through said viscous shear coupling and said one-way clutch, said coupling annularly surrounding said accessory shaft.

* * * * *